(12) United States Patent
Mitchell et al.

(10) Patent No.: US 9,866,893 B2
(45) Date of Patent: Jan. 9, 2018

(54) METHODS AND SYSTEMS FOR ACCESSING CONTENT

(71) Applicant: COMCAST CABLE COMMUNICATIONS, LLC, Philadelphia, PA (US)

(72) Inventors: Slade Mitchell, Chester Springs, PA (US); John Robinson, South Riding, VA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 0 days.

(21) Appl. No.: 14/463,264

(22) Filed: Aug. 19, 2014

(65) Prior Publication Data

US 2016/0057478 A1    Feb. 25, 2016

(51) Int. Cl.
| | |
|---|---|
| *H04N 7/16* | (2011.01) |
| *H04N 7/173* | (2011.01) |
| *H04N 21/426* | (2011.01) |
| *H04N 21/472* | (2011.01) |
| *H04L 27/34* | (2006.01) |
| *H04N 21/438* | (2011.01) |

(52) U.S. Cl.
CPC ... *H04N 21/4263* (2013.01); *H04N 21/47202* (2013.01); *H04L 27/34* (2013.01); *H04N 21/4383* (2013.01)

(58) Field of Classification Search
CPC ............... H04N 21/4263; H04N 21/4383
USPC ............................................. 725/23, 109
See application file for complete search history.

(56) References Cited

U.S. PATENT DOCUMENTS

| | | | |
|---|---|---|---|
| 2002/0029271 A1* | 3/2002 | Schwager | H04J 3/1682 709/226 |
| 2002/0044764 A1* | 4/2002 | Akamatsu | H04L 12/40117 386/291 |
| 2002/0049973 A1* | 4/2002 | Alten | A63F 13/12 725/40 |
| 2003/0128230 A1* | 7/2003 | Wugofski | H04L 12/2805 715/734 |
| 2003/0172132 A1* | 9/2003 | Lin | H04N 7/17318 709/219 |
| 2005/0102698 A1* | 5/2005 | Bumgardner | H04N 5/765 725/80 |

(Continued)

Primary Examiner — Pankaj Kumar
Assistant Examiner — Franklin Andramuno
(74) Attorney, Agent, or Firm — Ballard Spahr LLP

(57) ABSTRACT

Methods and systems for accessing content are provided. A non-tunable device (e.g., a device without the capability to tune to a particular channel) can access a particular channel via a tunable device (e.g., a device with the capability to tune to the particular channel). A computing device can facilitate content tuning. As an example, the non-tunable device can send user information (e.g., a request for content) to the computing device. The computing device can reserve the available tuner and transmit the tuning information (e.g., tuner reservation identifier) to the non-tunable device. Upon receiving the tuning information, the non-tunable device can transmit a tuning request (e.g., all or portion of tuning information, device identifier) to the tunable device. Upon receiving the tuning request, the tunable device can tune to the particular requested channel and transmit a data asset (e.g., requested content, tuning denial) to the non-tunable device.

20 Claims, 5 Drawing Sheets

(56) References Cited

U.S. PATENT DOCUMENTS

| | | | | |
|---|---|---|---|---|
| 2005/0259961 A1* | 11/2005 | Sano | ............... | G11B 27/034 386/297 |
| 2007/0067808 A1* | 3/2007 | DaCosta | ............ | H04N 7/17318 725/62 |
| 2008/0222705 A1* | 9/2008 | Goodmon | ............. | H04H 60/51 726/4 |
| 2008/0282312 A1* | 11/2008 | Blinnikka | ............. | H04N 5/765 725/153 |
| 2010/0146557 A1* | 6/2010 | Matsunaga | ............ | H04N 5/775 725/58 |
| 2010/0275234 A1* | 10/2010 | Kamon | ................ | H04N 5/775 725/58 |
| 2012/0212609 A1* | 8/2012 | Willis | ............... | H04N 5/23206 348/143 |
| 2013/0132994 A1* | 5/2013 | Murphy | ............ | H04N 21/6125 725/23 |
| 2015/0040172 A1* | 2/2015 | Zelesko | ............ | H04N 21/4622 725/110 |

* cited by examiner

METHODS AND SYSTEMS FOR ACCESSING CONTENT

BACKGROUND

Content can be accessed via a device that can connect to a communication channel. For example, a device with a quadrature amplitude modulation (QAM) tuner can access the content offered via a QAM channel. However, content transmitted via a particular channel cannot be accessed by a device without the capability to tune to that particular channel. These and other shortcomings are addressed by the present disclosure.

SUMMARY

It is to be understood that both the following general description and the owing detailed description are exemplary and explanatory only and are not restrictive. Provided are methods and systems for accessing, e.g., tuning, content. In an aspect, a non-tunable device (e.g., a device without the capability to tune to a particular channel) can access a particular channel via a tunable device (e.g., a device with the capability to tune to the particular channel). In an aspect, the non-tunable device can send user information to a computing device. The computing device can send the user information to a reservation system to determine the availability of a tuner and tunable device with the capability to tune to the particular channel. The reservation system can reserve the available tuner and transmit the tuning information to the non-tunable device. The non-tunable device can transmit a tuning request to the tunable device. The tunable device can tune to the particular requested channel and transmit a data asset to the non-tunable device.

In an aspect, a non-tunable device can transmit user information to a computing device such as a network device, server, and the like. The computing device can determine tuning information and provide the tuning information to the non-tunable device. The non-tunable device can transmit a tuning request to a tunable device. The tuner of the tunable device can tune to a channel for the requested content and transmit a data asset to the non-tunable device.

In another aspect, an example method can comprise receiving first tuning information and receiving second tuning information. The first tuning information can be compared to the second tuning information. A tuner can be caused to tune to a channel in response to the comparing of the first tuning information and the second tuning information.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
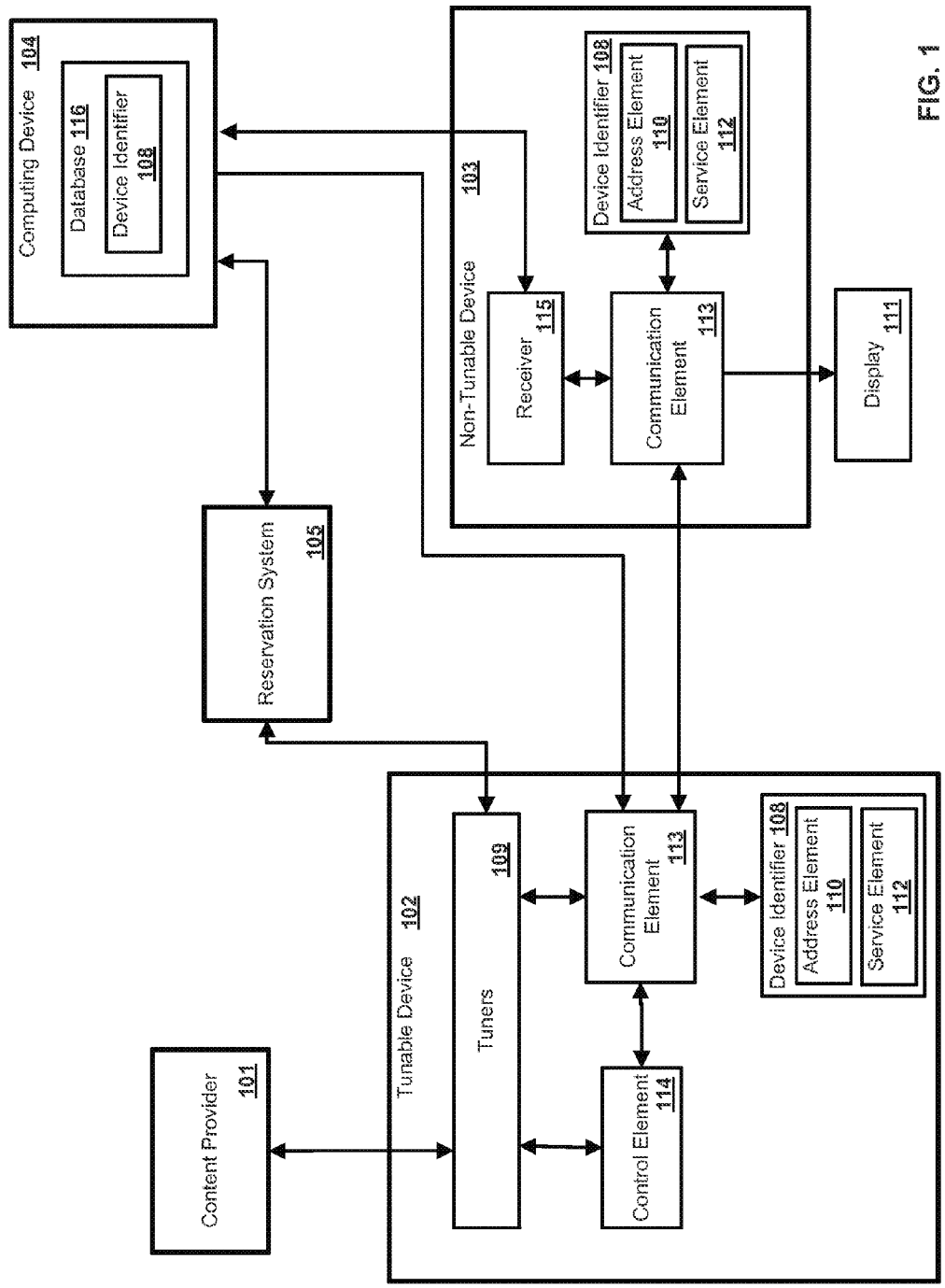
FIG. 1 illustrates various aspects of an exemplary system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of he other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium.

More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Methods and systems for accessing content are disclosed. Specifically, methods and systems for a non-tunable device to access the particular channel via a tunable device are disclosed. In an aspect, the content tuning can be achieved by the non-tunable device sending user information to a computing device (e.g., request for content offered by a particular channel). The computing device can send the user information to a reservation system to determine the availability of a tuner and tunable device with the capability of tuning to the particular channel. In an aspect, the computing device can comprise the reservation system. The computing device can send the user information to a tuning reservation system to determine the available tuner and tunable device associated with the available tuner. The reservation system can send tuning reservation information (e.g., tuner reservation identifier) to the computing device. The computing device can transmit tuning information (e.g., tuning reservation information) to the non-tunable device. Upon receiving the tuning information, the non-tunable device can transmit a tuning request (e.g., tuning reservation information and other information related to content tuning such as device identifier of the non-tunable device, content title, content type, channel information) to the tunable device. Upon receiving the tuning request, the tunable device can tune to the particular requested channel and transmit a data asset (e.g., requested content) to the non-tunable device.

FIG. 1 illustrates various aspects of an exemplary system in which the present methods and systems can operate. In an aspect, the system for accessing content can comprise a content provider 101, a tunable device 102, a non-tunable device 103, a computing device 104, and a reservation system 105.

In an aspect, the content provider 101 can provide content to the tunable device 102. In an aspect, the content provider 101 can combine the content from multiple sources and can distribute the content to user (e.g., subscriber) locations via a distribution system. There can be a multitude of user locations connected to distribution system. The signals provided by the content provider 101 can comprise a single content item or a multiplex that comprises several content items. As an example, the content provider 101 can provide pay-per-view or video-on-demand service. As an example, a tuner in the tunable device 102 can tune to a particular channel serviced by the content provider 101. As such, the content provider 101 can provide content to the tunable device 102 via the particular channel to which the tunable device 102 is tuned.

In an aspect, the tunable device 102 can be a device or system capable of accessing a particular channel (e.g., QAM channel). As an example, the tunable device can comprise a gateway system, set top box, communication terminal, combinations thereof, or the like. As an example, atonable device 102 can be a headless gateway system. In an aspect, the tunable device 102 does not need to be in a fixed location. The tunable device 102 can be deployed in any location convenient to communicate with the content provider 101 or the non-tunable device 103.

In an aspect, a non-tunable device 103 can be a device or system that is not capable of accessing a particular channel (e.g., QAM channel). The non-tunable device can be a device without tuning capabilities, or a device with tuning capabilities that are not being used. In an aspect, the non-tunable device 103 can be associated with a display 111. As an example, the non-tunable device 103 can comprise a set top box, programmable consumer electronic, smart phone, computer, tablet, mobile device, PDA, smart TV set, vehicle entertainment system, communications terminal, or the like. In an aspect, non-tunable device 103 does not need to be in a fixed location. The non-tunable device 103 can be deployed in any location convenient to communicate with the computing device 104 or tunable device 102.

In an aspect, the computing device 104 can comprise a server capable of providing data and/or services. As an example, the computing device 104 can be a personal computer, portable computer, smartphone, server, router, network computer, peer device, other common network node, and the like. As an example, the computing device 104 can communicate with the non-tunable device 103 for providing data and/or services. Specifically, the computing device 104 can provide content tuning services to the non-tunable device 103. In an aspect, the computing device 104 can allow the non-tunable device 103 to interact with remote resources such as data, devices, and files. For example, the computing device 104 can allow the non-tunable device 103 to interact with reservation system 105.

In an aspect, the reservation system 105 can be a computing device or system configured to communicate with tunable device 102 and to determine the availability of tuners capable of tuning to a particular content resource (e.g., channel). In an aspect, the reservation system 105 can be configured to reserve (e.g., provision, assign, allocate, etc.) one or more available tuners and obtain tuning reservation information (e.g., tuner reservation identifier). The reservation system 105 can transmit the tuning reservation information to the non-tunable device 103. The tuning reservation information can facilitate the use (e.g., directly and/or indirectly) of the one or more available tuners by a receiving device (e.g., the non-tunable device 103).

In an aspect, the tunable device 102 can comprise one or more tuners 109. As an example, a tuner can be an analog tuner (QAM tuner), a digital tuner (advanced television systems committee (ATSC) tuner), a hybrid tuner (e.g., switch between analog or digital tuner as needed). The tuners 109 can receive a content signal from a content provider (e.g., content provider 101). As an example, one or more tuners 109 can be tunable to a content provider (e.g., content provider 101).

In an aspect, the tunable device 102 can comprise a control element 114 communicatively coupled to the communication element 113. In an aspect, the control element 114 can be configured to receive a data asset comprising requested content from the tuner 109. In another aspect, the control element 114 can determine that the tuning request lacks the entitlement to the requested content and a data asset indicative of tuner denial can be obtained. In another aspect, the control element 114 can deliver the data asset (e.g., requested content or tuning denial) to the non-tunable device 103 via the communication element 113.

In an aspect, the tunable device 102 can communicate with a non-tunable device 103 by a communication element 113. The communication element 113 can be configured to enable communication between the tunable device 102 and one or more non-tunable devices 103, and/or between the tunable device 102 and the computing device 104 via a wired and/or wireless network using Wi-Fi, Bluetooth, MoCa, DLNA, Ethernet or any desired method or standard. As an example, communication element 113 can comprise software, hardware, and/or interfaces for presenting and/or receiving information to/from the user of the non-tunable device 103, such as a request for a specific content. As an example, the communication element 113 can request or query various files from a local source and/or a remote source. As a further example, the communication element 113 can transmit data to a local or remote device. As an example, the data can comprise user information, tuning information, a tuning request, combinations thereof, and the like.

In an aspect, the tunable device 102, the non-tunable device 103, and the computing device 104 can be associated with a respective user identifier or device identifier 108. As an example, the device identifier 108 can be any identifier, token, character, string, or the like, for differentiating one user or device from another user or device. In a further aspect, the device identifier 108 can identify a user or user device as belonging to a particular class of users or user devices (e.g., tunable device, non-tunable device). As a further example, the device identifier 108 can comprise information relating to the user device such as a manufacturer, a model or type of device, a service provider associated with the respective tunable device 102 and the non-tunable device 103, a state of the respective tunable device 102, the non-tunable device 103, and/or the computing device 104, a locator, and/or a label or classifier. Other information can be represented by the device identifier 108.

As an example, user identifier or device identifier 108 can be part of the user information, timing information, and/or tuning request.

In an aspect, the device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied upon to establish a communication session between the tunable device 102 and the non-tunable device 103 and/or between the non-tunable device 103 and the computing device 104. As a further example, the address element 110 can be used as an identifier or locator of one or more of the tunable device 102, the non-tunable device 103, and/or the computing device 104. In an aspect, the address element 110 can be persistent for a particular network. As an example, the address element 110 can be part of the user information, tuning information, and/or tuning request.

In an aspect, the service element 112 can comprise an identification of a service provider associated with one or more of the tunable device 102, the non-tunable device 103, and/or the computing device 104 and/or with the class of one or more of the tunable device 102, the non-tunable device 103, and/or the computing device 104. The class of the one or more of the tunable device 102, the non-tunable device 103, and/or computing device 104 can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to one or more of the tunable device 102, the non-tunable device 103, and/or the computing device 104. As a further example, the service element 112 can comprise information relating to a preferred service provider for one or more particular services relating to one or more of the tunable device 102, the non-tunable device 103, and/or the computing device 104. In an aspect, the address element 110 can be used to identify or retrieve data from the service element 112, or vice versa. As an example, service element 112 can comprise identification of a content provider to which a specific user or device is entitled to access. As another example, service element 112 can comprise identification of content type, for example, pay per view content, video on demand content, and the like.

In an aspect, the computing device 104 can be configured as (or disposed at) a central location (e.g., a headend, or processing facility), which can receive content (e.g., data, input programming) from multiple sources.

In an aspect, the computing device 104 can communicate with a database 116 configured for storing a plurality of tiles (e.g., web pages), user identifiers, device identifiers, records, or other information. For example, the database 116 can store device identifiers for the tunable device 102 and non-tunable device 103. In an aspect, the computing device 104 can manage the communication between the non-tunable device 103 and a database 116 for sending and receiving data therebetween. For example, the non-tunable device 103 can request and/or retrieve a file from the database 116. In an aspect, the database 116 can store information relating to tunable device 102 and non-tunable device 103 such as the device identifier 108, address element 110, and/or the service element 112. Specifically, the computing device 104 can obtain the device identifier 108 from the non-tunable device 103 and retrieve information from the database 116 such as the address element 110 and/or the service element 112. As a further example, the computing device 104 can obtain the address element 110 from the non-tunable device 103 and can retrieve the service element 112 from the database 116, or vice versa. Any information can be stored in and retrieved from the database 116. The database 116 can be disposed remotely from the computing device 104 and accessed via direct or indirect connection. The database 116 can be integrated with the computing system 104 or some other device or system.

As an example, the computing device 104 can be configured to communicate with the non-tunable device 103 by cross-platform runtime environment (XRE). As an example, the computing device 104 can comprise an XRE server. Accordingly, the non-tunable device 103 can comprise an XRE receiver. As an example, one or more XRE applications can be implemented as a host on the computing device 104. The XRE applications can also be loaded to an XRE receiver (e.g., receiver 115) on the non-tunable device 101 In an aspect, the communication between the computing device 104 and the non-tunable device 103 can enable the computing device 104 to receive user information from non-tunable device 103 and transmit tuning information to the non-tunable device 103.

In one aspect, the network connection between devices or systems in FIG. 1 can comprise a packet switched network (e.g., interact protocol based network), a non-packet switched network (e.g., quadrature amplitude modulation based network), and/or the like. The network connection can comprise network adapters, switches, routers, and the like connected through wireless links (e.g., radio frequency, satellite) and/or physical links (e.g., fiber optic cable, coaxial cable, Ethernet cable).

In an aspect, the communication between the devices and systems in FIG. 1 can be implemented to operate over hypertext transfer protocol (HTTP), Transmission Control Protocol (TCP), Internet Protocol (IP), File Transfer Protocol (FTP), Telnet, Hypertext Transfer Protocol Secure (HTTPS), Session Initiation Protocol (SIP), Simple Object Access Protocol (SOAP), Extensible Mark-up Language (XML) and variations thereof, Simple Mail Transfer Protocol (SMTP), Real-Time Transport Protocol (RTP), User Datagram Protocol (UDP), Global System for Mobile Communications (GSM) technologies, Code Division Multiple Access (CDMA) technologies, Evolution Data Optimized Protocol (EVDO), Internet Group Management Protocol (IGMP), Real Time Streaming Protocol (RTSP), Time Division Multiple Access (TDMA) technologies, radio frequency (RF) signaling technologies, wireless communication technologies (e.g., Bluetooth, Wi-Fi, etc.) and other suitable communications technologies.

In an aspect, content tuning can comprise the non-tunable device 103 transmitting user information to the computing device 104 and receiving tuning information from the computing device 104 based on the user information. Upon receiving the tuning information, the non-tunable device 103 can transmit a tuning request to a tunable device 102 based on the tuning information, and receive a data asset from the tunable device 102 based on the tuning request.

As an example, the user information can comprise a request for content. Specifically, the request for content can comprise a title of the content (e.g., title of a television program or a movie), a type of content (e.g., pay per view content, video on demand content), channel information (e.g., channel 10, a frequency, an asset location information, etc.), and the like. In an aspect, the user information can comprise a device identifier of the source of the user information (e.g., device type, device capabilities, location, network address of the non-tunable device 103). The device identifier can be used by the computing device 104 to authenticate the source of the user information.

In an aspect, the computing device 104 can determine tuning information. The tuning information can comprise a tuner reservation identifier. The tuner reservation identifier can be indicative of a reserved tuner and associated tunable device 102 (e.g., tuner identifier, device identifier 108). For example, the tuner reservation identifier can comprise a tuner identifier. As another example, the tuner reservation identifier can comprise an address (e.g., interact protocol address, media access control address) of the tunable device 102.

In another aspect, the computing device 104 can communicate with the reservation system 105 to determine the tuning information. As an example, the computing device can send user information to the reservation system 105. The reservation system 105 can determine the availability of the tuners according to the user information. If a tuner is available, the tuner can be reserved through the reservation system 105 and a tuner reservation identifier can be determined.

In an aspect, upon receiving the tuning information, the non-tunable device 103 can transmit tuning request to tunable device 102. The tuning request can comprise the tuner reservation identifier as described in tuning information. Moreover, the tuning request can comprise a content request, as described in user information. The content request can comprise the title of the content (e.g., title of a television program or a movie), the type of content (e.g., pay per view content, video on demand content), channel information (e.g., channel 10, a frequency, an asset location information, etc.), device identifier of the source of the user information (e.g., device type, device capabilities, location, network address of the non-tunable device 103), and the like.

In an aspect, the tunable device 102 can receive first tuning information from the computing device 104. The first tuning information can comprise an identifier (e.g., device type, device capabilities, location, network address) of the content requester (e.g., non-tunable device 103). The tunable device can compare first tuning information and the tuning request (second tuning information). If the first tuning information matches (e.g., identical or partially identical) the second tuning information, the reserved tuner can tune to the requested channel and the requested content can be provided to the non-tunable device 103. In an aspect, the first tuning information and/or the second tuning information can indicate lack of entitlement to the requested content. As a result, a notification (e.g., error and/or denial of service notification) can be received. As an example, a notification can be in the form of audio content or video content. Specifically, the notification can be a sound, an error code, text, a protocol message, or the like. In an aspect, the notification (e.g., tuning denial) can be carried in the form of a custom HTTP header or field. The notification can be transmitted to non-tunable device 103. The non-tunable device 103 can transmit the notification to the computing device 104.

Figure 2:
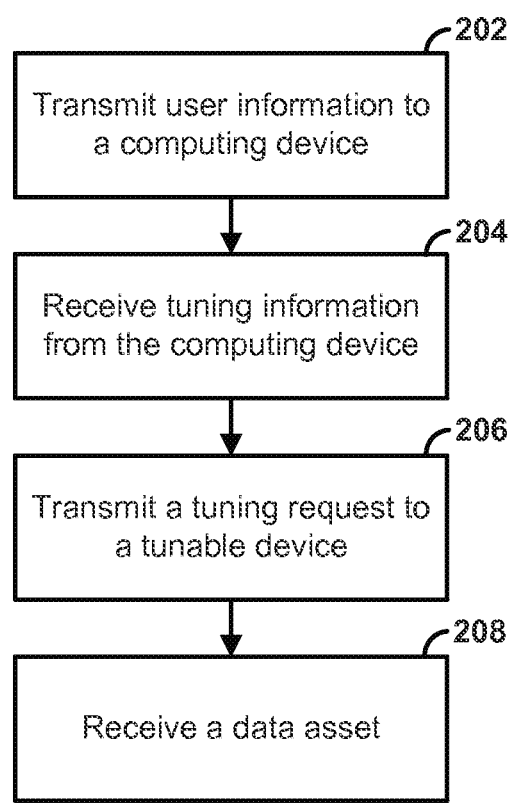
FIG. 2 is a flowchart illustrating an example method for accessing content.

FIG. 2 is a flowchart illustrating an example method. At step 202, user information can be transmitted from a non-tunable device to a computing device. In an aspect, the user information can comprise a request for content. For example, the content can be content offered via a QAM channel which the non-tunable device cannot access. The non-tunable device can be a device without tuning capabilities, or a device with tuning capabilities that are not being used. As an example, the request for content can comprise a title of the content (e.g., a title of a television program or a movie), a type of content (e.g., pay per view content, video on demand content), channel information (e.g., channel 10, a frequency, an asset location information, etc. and the like. Moreover, the user information can comprise a device identifier (e.g., device type, device capabilities, location, network address) for the non-tunable device 103. The device identifier can be used by the computing device 104 to authenticate the non-tunable device as the source of the user information. In another aspect, the user information can be sent to reservation system 105 to determine the availability of a tuner for the requested content. A tuner reservation identifier can be received upon the successful tuner reservation.

At step 204, tuning information can be received from the computing device 104 based at least in part on the user information. In an aspect, the tuning information can comprise a tuner reservation identifier. As an example, the tuner can be reserved via the reservation system 105 and a tuner reservation identifier can be received. The tuning information (e.g., a tuner reservation identifier) can be transmitted from the computing device 104 to the non-tunable device 103.

At step 206, a tuning request can be transmitted to a tunable device based on the tuning information. In an aspect, upon receiving the tuning information from the computing device 104, the non-tunable device 103 can transmit a tuning request to the tunable device 102. The tuning request can also be transmitted to the tunable device 102 from the computing device 104. In an aspect, the tuning request can comprise all or portion of the tuning information received at step 204. For example, the tuning request can comprise the tuner reservation identifier. The tuning request can also comprise a request for content, as described in the user information. As an example, the request for content can comprise a title of the content (e.g. title of a television program or a movie), type of content (e.g., pay per view content, video on demand content), channel information (e.g., channel 10, a frequency, an asset location information, etc.), and the like. Moreover, the tuning request can comprise a device identifier (e.g., device type, device capabilities, location, network address) for the non-tunable device 103. The device identifier can be used by the tunable device 102 to communicate with the non-tunable device 103. The tuning request can be processed in the tunable device 102. For example, a reserved tuner 109 can tune to a channel according to the tuner reservation identifier, title of the content, type of content, channel information in the tuning request, and the like.

At step 208, a data asset can be received based on the tuning request. In an aspect, the data asset can comprise requested content. In another aspect, the data asset can comprise a tuning denial. As an example, the tuning denial can indicate lack of entitlement to the requested content. In an aspect, a notification indicative of tuning denial can be received. As an example, the notification can be in the form of audio content or video content. Specifically, the notification can be a sound, an error code, text, a protocol message, or the like. In an aspect, the notification (e.g., tuning denial) can he carried in the form of a custom HTTP header or field. In an aspect, the data asset can be further displayed on the non-tunable device 103, for example on display 111.

Figure 3:
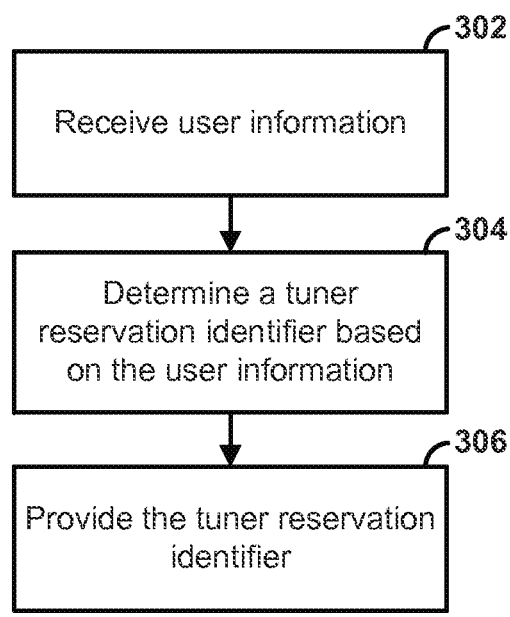
FIG. 3 is a flowchart illustrating another example method for accessing content.

FIG. 3 is a flowchart illustrating another example method. At step 302, user information can he accessed or received from a source. In an aspect, the user information can comprise a user and/or device identifier of the source. In an aspect, the source can be a non-tunable device 103. In another aspect, the user information can comprise a request for content. As an example, the request for content can comprise a title of the content (e.g., title of a television program or a movie), a type of content (e.g., pay per view content, video on demand content), channel information (e.g., channel 10, a frequency, an asset location information, etc.), and the like. Moreover, the user information can comprise a device identifier of the source of the user information (e.g., device identifier of non-tunable device 103). The device identifier can be used by the computing device 104 to authenticate the source of the user information.

At step 304, a tuner reservation identifier associated with the user information can be determined. In an aspect, determining a tuner reservation identifier can comprise determining an availability of a tuner. In another aspect, determining a tuner reservation identifier can comprise determining the availability of a tunable device associated with the available tuner. A tuner can be reserved through reservation system 105 and a tuner reservation identifier can be received upon the successful tuner reservation. The tuner reservation identifier can comprise a tuner identifier and a tunable device identifier associated with the tuner. For example, the reservation system 105 can determine what content is being requested and identify the tuners that are available to provide the requested content. As another example, if the content being requested is HD content, the reservation system 105 can determine which tuners can have access to HD content. As another example, if the content being requested is VOD content, the reservation system 105 can determine which tuners can have access to VOD content.

At step 306, the tuner reservation identifier can be provided. For example, the tuner reservation identifier can be provided to the source of the user information. As an example, the tuner reservation identifier can be provided to the non-tunable device 103. The tuner reservation identifier can he transmitted from the non-tunable device 103 to the tunable device 102 as part of the tuning request. As another example, the tuner reservation identifier can be transmitted directly from the computing device 104 to the tunable device 102.

Figure 4:
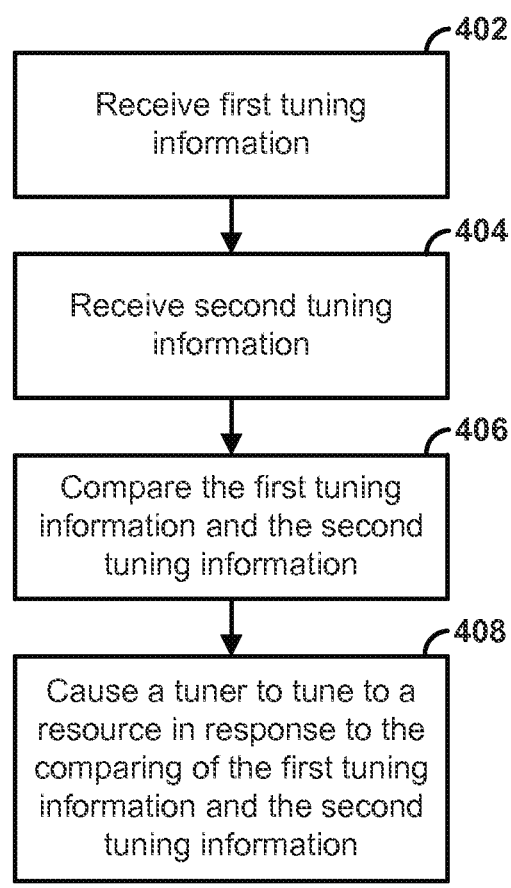
FIG. 4 is a flowchart illustrating yet another example method for accessing content.

FIG. 4 is a flowchart illustrating another method. At step 402, first tuning information can be accessed or received. As an example, the tunable device 120 can receive first tuning information from the computing device 104. In an aspect, the first tuning information can comprise a first tuner reservation identifier. As an example, the first tuner reservation identifier can comprise a. tuner identifier, a device identifier to identify the content requestor (e.g., device type, device capabilities, location, network address of the non-tunable device 103), and the like. In another aspect, the first tuning information can comprise a start time and a duration time of the tuner reservation.

At step 404, second tuning information can be accessed or received. As an example, the tunable device 102 can receive second tuning information from the non-tunable device 103. The second tuning information can be a tuning request from the non-tunable device 103. In an aspect, the second tuning information can comprise a second tuner reservation identifier. The second tuner reservation identifier can be indicative of available tuners and the tunable device associated with the tunable device. As an example, the second tuner reservation identifier can comprise a device identifier for the tunable device (e.g., IP address or MAC address for the tunable device 102). In another aspect, the second tuner identifier can comprise a content request, wherein the content request can comprise a title of the content (e.g. title of a television program or a movie), type of content (e.g., pay per view content, video on demand content), channel information (e.g. channel 10, a frequency, an asset location information, etc.), and the like.

At step 406, the first tuning information and the second tuning information can be compared. In an aspect, comparing the first tuning information and the second tuning information can comprise determining if the first tuning information matches (e.g., identical, partially identical) the second tuning information. As an example, the comparison can comprise determining if a first tuner reservation identifier (e.g., the tuner identifier and/or device identifier receiving from the computing device 104) associated with the first tuning information matches a second tuner reservation identifier (e.g., the tuner identifier and/or device identifier received form the non-tunable device 103) associated with the second tuning information At step 408, in response to comparing the first tuning information and the second tuning information, a tuner can be caused to tune to a resource such as a channel. For example, if at least a portion of the first tuning information matches at least a portion of the second tuning information, a tuner can be tuned to a channel to receive requested content. In an aspect, the received content can be further provided to the non-tunable device 103. In an aspect, a data asset can comprise a notification indicative of tuning denial. As an example, a notification can be in the form of audio content or video content. Specifically, the notification can be a sound, an error code, text, a protocol message, or the like. In an aspect, the notification can be carried in the form of a custom HTTP header or field.

Figure 5:
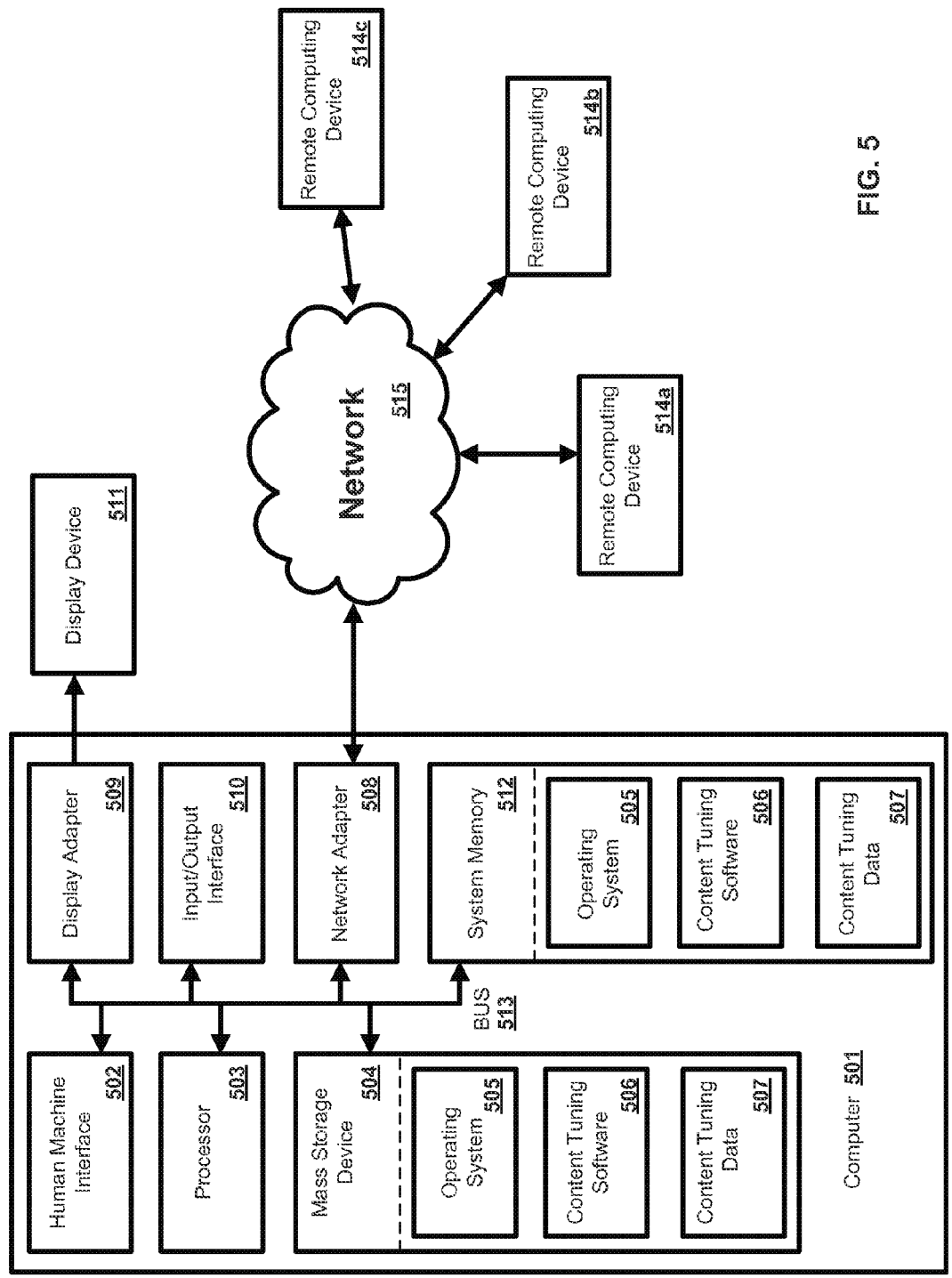
FIG. 5 is a block diagram illustrating an example computing device in which the present systems and methods can operate.

In an aspect, the methods and systems can be implemented on a computer 501 as illustrated in FIG. 5 and described below. By way of example, the computer 501 as illustrated in FIG. 5 can be tunable device 102, non-tunable device 103, or computing device 104, reservation system 105, content provider 101 of FIG. 1. As another example, the remote computing devices 514a,b,c in FIG. 5 can be tunable device 102, non-tunable device 103, computing device 104, reservation system 105, content provider 101. Similarly, the methods and systems disclosed can utilize one or inure computers to perform one or more functions in one or more locations. FIG. 5 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of the computer 501 can comprise, but are not limited to, one or more processors 503 or processing units, a system memory 512, and a system bus 513 that couples various system components including the processor 503 to the system memory 512. In the case of multiple processing units 503, the system can utilize parallel computing.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 513, and all buses specified in this description can also be implemented over a wired or wireless network connection and each of the subsystems, including the processor 503, a mass storage device 504, an operating system 505, content tuning software 506, content tuning data 507, a network adapter 508, system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as content tuning data 507 and/or program modules such as operating system 505 and content tuning software 506 that are immediately accessible to and/or are presently operated on by the processor 503.

In another aspect, the computer 501 can also comprise other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and content tuning software 506. Each of the operating system 505 and content tuning software 506 (or some combination thereof) can comprise elements of the programming and the content tuning software 506. Content tuning data 507 can also be stored on the mass storage device 504. Content tuning data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processor 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like. The display 511 and computer 501 can be part of one device, or separate devices.

The computer 501 can operate in a networked environment using logical connections to one or more remote computing devices 514a,b,c. By way of example, a remote computing device can be a personal computer, portable computer, smartphone, a server, a router, a network computer, a peer device or other common network node, and so on. Logical connections between the computer 501 and a remote computing device 514a,b,c can be made via a network 515, such as a local area. network (LAN) and/or a general wide area network (WAN). Such network connections can be through a network adapter 508. A network adapter 508 can be implemented in both wired and wireless environments. Such networking environments are conventional and commonplace in dwellings, offices, enterprise-wide computer networks, intranets, and the Internet.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of content tuning software 506 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
transmitting, by a non-tunable device, user information to a computing device;

receiving, by the non-tunable device, tuning information from the computing device based at least in part on the user information, wherein the tuning information identifies a tunable device;

transmitting, by the non-tunable device, a tuning request from the non-tunable device to the tunable device identified by the tuning information, wherein the tuning request comprises channel information and the tunable device is configured to tune to a channel identified by the channel information in response to the tuning request; and receiving, by the non-tunable device, a data asset from the tunable device based on the tuning request.

2. The method of claim 1, wherein the tuning information comprises a tuner reservation identifier.

3. The method of claim 1, wherein the user information comprises a request for content.

4. The method of claim 1, wherein the tuning request comprises a tuner reservation identifier.

5. The method of claim 1, wherein the tuning request comprises a request for pay-per-view content, video-on-demand content, or both.

6. The method of claim 1, wherein the tunable device comprises one or more QAM tuners.

7. The method of claim 1, wherein the data asset comprises content or a tuning denial.

8. The method of claim 1, further comprising processing the data asset to provide displayed content.

9. An apparatus comprising:
a device identifier comprising user information;
a communication element configured to transmit the user information to a computing device; and
a receiver configured to receive tuning information from the computing device based at least in part on the user information, wherein the tuning information identifies a tunable device;
wherein the communication element is further configured to transmit a tuning request to the tunable device identified by the tuning information, wherein the tuning request comprises channel information and the tunable device is configured to tune to a channel identified by the channel information in response to the tuning request;
wherein the receiver is further configured to receive a data asset from the tunable device based on the tuning request.

10. The apparatus of claim 9, wherein the tuning information comprises a tuner reservation identifier.

11. The apparatus of claim 9, wherein the user information further comprises a request for content.

12. The apparatus of claim 9, wherein the tuning request comprises a tuner reservation identifier.

13. The apparatus of claim 9, wherein the tunable device comprises one or more QAM tuners.

14. The apparatus of claim 9, further comprising a display configured for displaying the data asset.

15. The apparatus of claim 9, wherein the data asset comprises content or a tuning denial.

16. A system comprising:
at least one non-tunable device configured to at least:
transmit user information to a computing device;
receive tuning information from the computing device based at least in part on the user information, wherein the tuning information identifies a tunable device;
transmit a tuning request from the non-tunable device to the tunable device identified by the tuning information, wherein the tuning request comprises channel information and the tunable device is configured to tune to a channel identified by the channel information in response to the tuning request; and
receive a data asset from the tunable device based on the tuning request; and
the computing device, configured to at least:
receive the user information; and
transmit the tuning information.

17. The system of claim 16, wherein the tuning information comprises a tuner reservation identifier.

18. The system of claim 16, wherein the user information comprises a request for content.

19. The system of claim 16, wherein the tuning request comprises a tuner reservation identifier.

20. The system of claim 16, wherein the tuning request comprises a request for pay-per-view content, video-on-demand content, or both.

* * * * *